United States Patent [19]

Ishimoto et al.

[11] Patent Number: 5,485,407
[45] Date of Patent: Jan. 16, 1996

[54] INTERPOLATION DEVICE FOR SCALE ARRANGEMENT

[75] Inventors: Shigeru Ishimoto; Yasuhiko Matuyama, both of Yokohama; Hideo Maejima, Kawasaki, all of Japan

[73] Assignee: Sony Magnescale Inc., Tokyo, Japan

[21] Appl. No.: 152,390

[22] Filed: Nov. 16, 1993

[30] Foreign Application Priority Data

Nov. 27, 1992 [JP] Japan .................... 4-318181

[51] Int. Cl.$^6$ .................................... G06G 7/30
[52] U.S. Cl. .................... 364/577; 364/582; 364/581; 364/474.31
[58] Field of Search .................... 364/577, 581, 364/582, 474.31; 360/77.04, 77.03, 77.08, 901, 902; 318/805, 807, 809, 568.15; 370/32.1, 24, 29, 30; 341/111–113, 115, 118, 143, 156; 340/870.04, 870.05, 870.25; 324/115, 130, 76.75

[56] References Cited

U.S. PATENT DOCUMENTS 3,831,168  8/1974  Gronner et al. .................... 341/113
4,462,083  7/1984  Schwefel .......................... 364/577
4,594,540  6/1986  Currie et al. ..................... 341/112
4,630,033  12/1986  Baher ............................ 341/111
5,121,116  6/1992  Taniguchi ........................ 341/113

FOREIGN PATENT DOCUMENTS 0377045  7/1990  European Pat. Off. .

Primary Examiner—Emanuel T. Voeltz
Assistant Examiner—Hal D. Wachsman
Attorney, Agent, or Firm—Foley & Lardner

[57] ABSTRACT

An interpolation device for a scale arrangement receives sine wave and cosine wave signals indicative of a measuring data from the scale arrangement and calculates a DC offset value, an amplitude coefficient and an amount of a phase drift on the basis of the received signals. The interpolation device outputs a correct angle signal upon removing a DC offset, a gain level error, a gain unbalance and a phase drift from received signals. Therefore, the interpolation device realizes a mechanical structure of the scale arrangement to be simple.

8 Claims, 6 Drawing Sheets

INTERPOLATION DEVICE FOR SCALE ARRANGEMENT

BACKGROUND OF THE INVENTION

1. Field of the Invention

The present invention relates to improvements in an interpolation device for a scale arrangement, and more particularly to an interpolation device for a scale arrangement which arrangement is used for detecting a rotational position of a motor, movement of a table in a machine tool and the like.

2. Description of the Prior Art

Various types of scale arrangements have been proposed and practically used in order to detect a position of a moving subject such as a rotational position of a motor or a movement of a table in a machine tool. A typical scale arrangement has a sensor such as a magnetic sensitive element which implements a readout of a scale in the form of electrical signals of a sine wave and a cosine wave, and obtains the moving direction and position by analyzing the detected signals.

However, it is difficult to make a scale arrangement so as to keep a distance and an angle between a scale T and a sensor S constant during the operation of the scale arrangement. For example, the sensor S generates a wave relative to the scale T as shown in FIG. 5, and the inclined angle of the sensor S relative to the scale T becomes different in the forward movement and the backward movement as shown in FIG. 6. Furthermore, Abbe's error occurs when the sensor S is not aligned parallel with the scale T in a non-contact type scale arrangement as shown in FIG. 7. Accordingly, a signal detected by the sensor S includes various errors. For example, a DC offset voltage $O_A$, $O_B$ is included in the signal as shown in FIG. 8; a deviation of a gain level is generated as shown in FIG. 9; a gain of the sine wave signal and the gain of the sine wave signal becomes different as shown in FIG. 10; and a phase drift between the sine wave signal and the cosine wave signal is generated. Although these errors are negligible in a scale arrangement which is not required to have a high discrimination, these errors can not be negligible when a scale arrangement is required to have a high discrimination such as 0.5 μm, 0.1 μm or 0.05 μm. Furthermore, such errors appear as a fatal error in a long-size scale arrangement requiring a high discrimination. Conventionally, the generation of such errors during movement of the sensor S has been prevented by the improvement of the mechanical structure. However, this mechanical improvement requires a fine machining degree in the structure, and therefore raises the production cost.

SUMMARY OF THE INVENTION

It is an object of the present invention to provide an improved interpolation device for a scale arrangement which device automatically and electronically corrects the measuring errors.

An interpolation device according to the present invention is for a scale arrangement and comprises a first input means which receives an input sine wave signal from the scale arrangement and a second input means which receives an input cosine wave signal from the scale arrangement. A first output means has a first offset value calculating circuit which calculates an offset value of the input sine wave signal and a first amplitude coefficient calculating circuit which calculates an amplitude coefficient of the input sine wave signal. The first output means outputs an interpolated sine wave signal from which the offset value of the input sine wave has been removed and which has a first predetermined amplitude coefficient according to the values from the first offset value calculating circuit and the first amplitude coefficient calculating circuit. A second output means has a second offset value calculating circuit which calculates an offset value of the input cosine wave signal and a second amplitude coefficient calculating circuit which calculates an amplitude coefficient of the input cosine wave signal. The second output means outputs a cosine wave signal from which the offset value of the input cosine wave is removed and which has a second predetermined amplitude coefficient according to the values from the second offset value calculating circuit and the second amplitude coefficient calculating circuit. A correcting means corrects a phase drift between the sine wave signal from the first output means and the cosine wave signal from the second output means. The correcting means outputs a correct measured angle on the basis of the corrected sine and cosine wave signals in phase drift. A decision means decides an accomplishment of one period of measuring period on the basis of the correct measured angle signal of the correcting means and outputting a synchronizing signal to the first output means, the second output means and the correcting means.

With this arrangement, it becomes possible to remove the errors of the signal without improving a high machining accuracy of a mechanical structure. This provides an inexpensive and high-productive scale arrangement with high accuracy.

BRIEF DESCRIPTION OF THE DRAWINGS

In the drawings, like reference numerals designate like elements and like parts throughout all figures, in which.

DETAILED DESCRIPTION OF THE INVENTION

Figure 1:
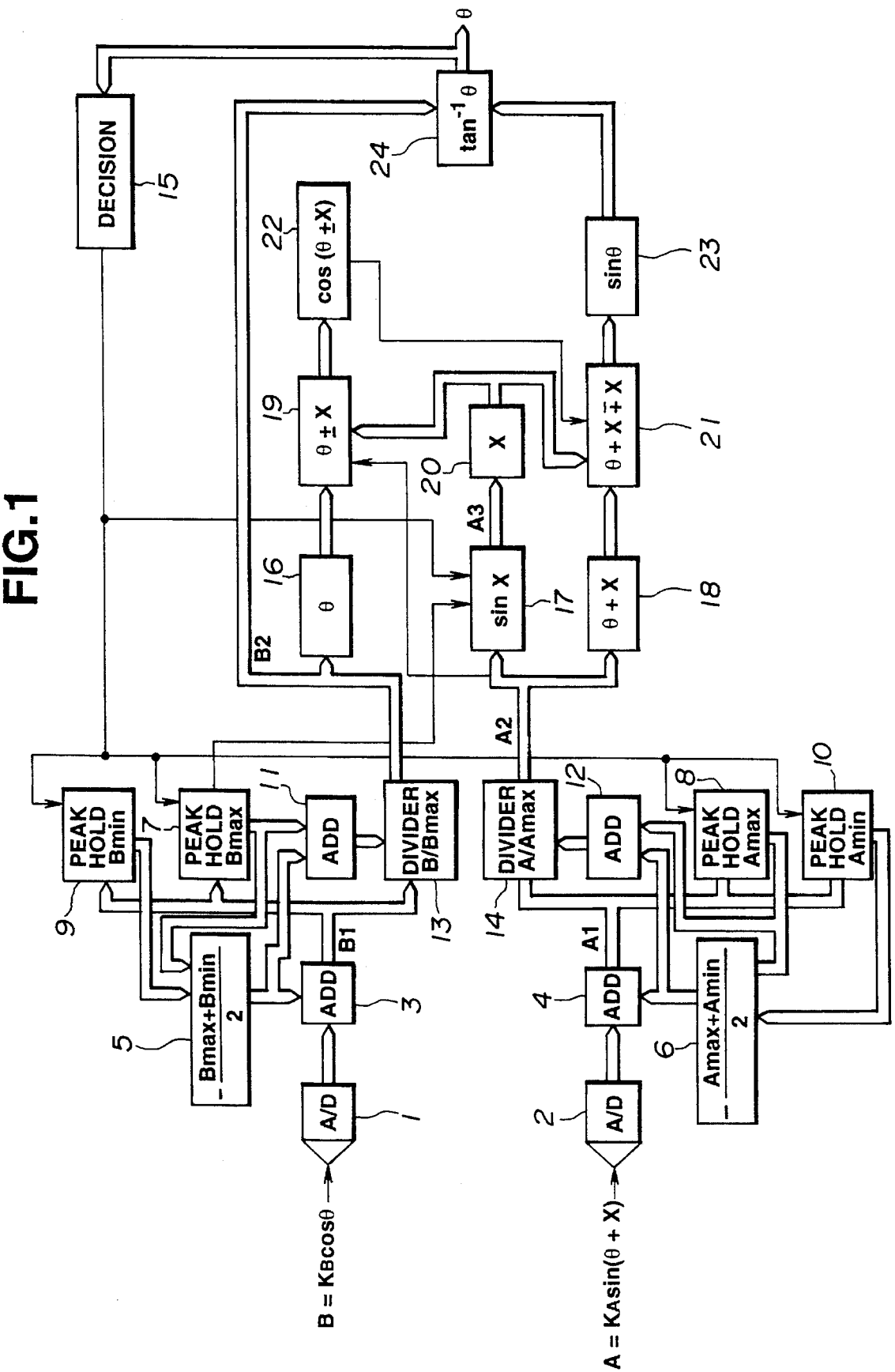
FIG. 1 is a block diagram which shows a first embodiment of an interpolation device for a scale arrangement according to the present invention.

Referring to FIG. 1, there is shown a first embodiment of an interpolation device for a scale arrangement according to the present invention.

As shown in FIG. 1, sensors 1 and 2 in the interpolation device obtain inputs B and A, respectively which inputs are represented by the following equations (1) and (2):

$$A = K_A \sin(\theta + X) + O_A \quad (1)$$

$$B = K_B \cos\theta + O_B \quad (2)$$

where $K_A$ is an amplitude coefficient of the input A; $K_B$ is an amplitude coefficient of the input B; $O_A$ is an offset value of the input A; $O_B$ is an offset value of the input B; and X is a phase shift.

Figure 8:
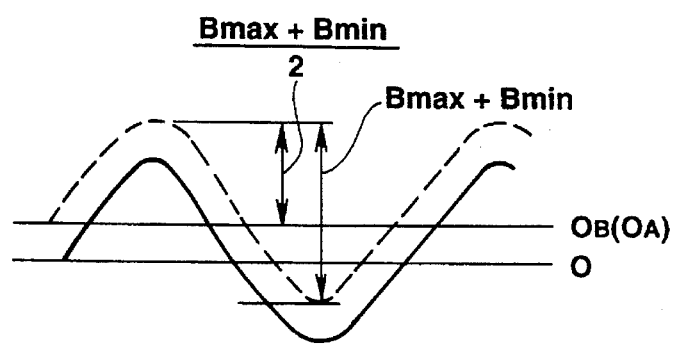
FIG. 8 is a graph showing an offset of a signal characteristic of the scale arrangement.
Figure 9:
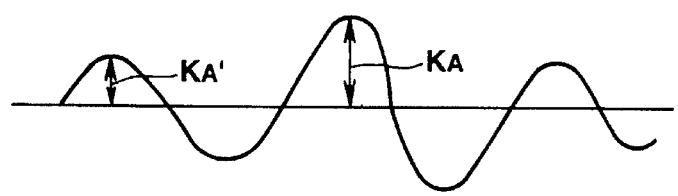
FIG. 9 is a graph showing a deviation of a gain level of the signal characteristic of the scale arrangement.
Figure 10:
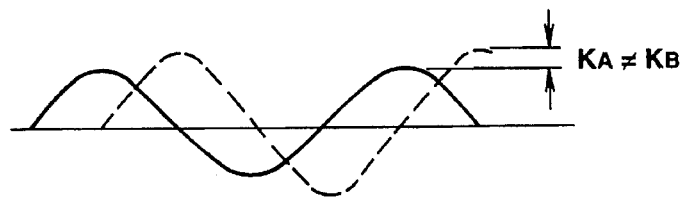
FIG. 10 is a graph which shows an unbalance of gain of the signal characteristic of the scale arrangement.
Figure 11:
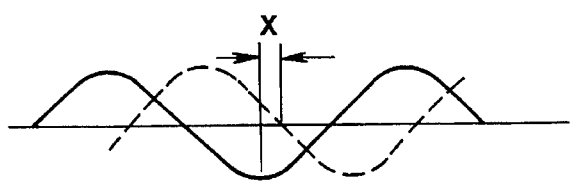
FIG. 11 is a graph which shows a phase drift of the signal inputted in the interpolation device according to the present invention.

The input B is transmitted into a digital signal through an A/D converter within the sensor 1, and the converted signal is applied to one of two input terminals of the adder 3. The other input terminal of the adder 3 receives an average value (offset value) of an amplitude signal in a previous operation from an average circuit 5. As a result of the adding in the adder 3, a digital signal $B_1$ from which an offset has been removed is outputted from the adder 3. Since the offset value is obtained as an average value between a maximum amplitude $B_{max}$ and a minimum amplitude $B_{min}$ as shown in FIG. 8, the average value $O_B$ in the previous operation is represented by the following equation (3):

$$O_B = (B_{max} + B_{min})/2 \quad (3)$$

Since the digital signal $B_1$ is obtained by subtracting the offset value $O_B$ from the input B, the digital signal $B_1$ is represented by the following equation (4):

$$B1 = B - O_B = K_B \cos\theta \quad (4)$$

The obtained digital signal $B_1$ is applied to peak hold circuits 7 and 9, and a divider 13. The peak hold circuit 7 holds the maximum value $B_{max}$ of the input B according to a signal from a decision circuit 15. The peak hold circuit 9 holds a minimum value $B_{min}$ of the input B according to the signal from the decision circuit 15. The outputs from the peak hold circuits 7 and 9 are applied to the averaging circuit 5. In the averaging circuit 5, an average value is calculated as shown in the equation (3). The obtained average value is changed in polarization and then kept on. The output from the averaging circuit 5 is applied to an adder 11 wherein the output from the averaging circuit 5 is added with the maximum value $B_{max}$ from the peak hold circuit 7. The value $K_B$ obtained by the adder 11 represents an amplitude coefficient of the signal B and is derived by the following equation (5):

$$K_B = B_{max} - (B_{max} + B_{min})/2 \quad (5)$$
$$= (B_{max} - B_{min})/2$$

The value $B_1$ represented by the equation (4) and the value $K_B$ represented by the equation (5) are inputted into the divider 13, and a value B2 is obtained by dividing the equation (4) by the equation (5) and therefore represented as a normalized cosine wave by the following equation (6):

$$B2 = \frac{B1}{K_B} = \frac{K_B \cos\theta}{K_B} = \cos\theta \quad (6)$$

Similarly, the input signal A is processed in the device shown in FIG. 1. That is, the input signal A is converted into a digital signal by an A/D converter of the sensor 2. Next, an offset value $O_A$ is subtracted from the converted digital signal through an adder 4. Further, a value $A_1$ is normalized by the divider 14. Such translations are represented by the following equations (7), (8), (9) and (10):

$$O_A = (A_{max} + A_{min})/2 \quad (7)$$

$$A1 = A - O_A = K_A \sin(\theta + X) \quad (8)$$

$$K_A = A_{max} - (A_{max} + A_{min})/2 \quad (9)$$
$$= (A_{max} - A_{min})/2$$

$$A2 = \frac{A1}{K_A} = \sin(\theta + X) \quad (10)$$

A latch circuit 17 latches data $\sin(\theta + X)$ by every input of the maximum value $B_{max}$ into the peak hold circuit 7. Since the signal B takes a maximum value when $\theta = 2 n\pi$ (n is positive integer), the latch circuit 17 latches a value A3 represented by the following equation (11):

$$A3 = \sin(\theta + X) = \sin(2 n\pi + X) = \sin X \quad (11)$$

An inverse function $X = \sin^{-1} A3$ of the equation (10) is obtained by an inverse function generator 20. The obtained inverse function X is applied to adders 19 and 21. On the other hand, an inverse function generator 16 outputs a value $\theta = \cos^{-1} B2$. Then, the value $\theta = \cos^{-1} B2$ is added to the value X in the adder 19. More particularly, when $\theta$ takes a value positioned in the first or third quadrant, the output value from the adder 19 becomes $\theta + X$. When in the second or fourth quadrant, the output value from the adder 19 becomes $\theta - X$. A function generator 22 generates a cosine wave signal $\cos(\theta \pm X)$ according to the output $\theta \pm X$ from the adder 19.

An inverse function generator 18 generates a value $\theta + X = \sin^{-1} A2$ and applies to an adder 21. In the adder 21 the value $\theta + X = \sin^{-1} A2$ from the inverse function generator 18 is added to the signal X from the inverse function generator 20. More particularly, when $\theta$ takes a value positioned in the first or third quadrant, the output value from the adder 21 becomes $(\theta + X) - X$. When in the second or fourth quadrant, the output value from the adder 21 becomes $(\theta + X) + X$. The polarity of the value X is determined according to the plus or minus character of $\cos(\theta + X)$.

The adder 21 outputs $\theta = \theta + X - X$, and the function generator 23 generates a correct sine wave signal $\sin\theta$ by removing the phase drift from the input signal. The inverse function generator 24 calculates $\tan\theta$ according to $\sin\theta$ from the function generator 23 and $\cos\theta$ from the divider 13, and outputs $\theta$ which is an inverse function of $\tan\theta$. With these operations in the interpolation device, a correct measured output $\theta$ is obtained upon removing the phase drift during a detection by the sensor.

Figure 2:
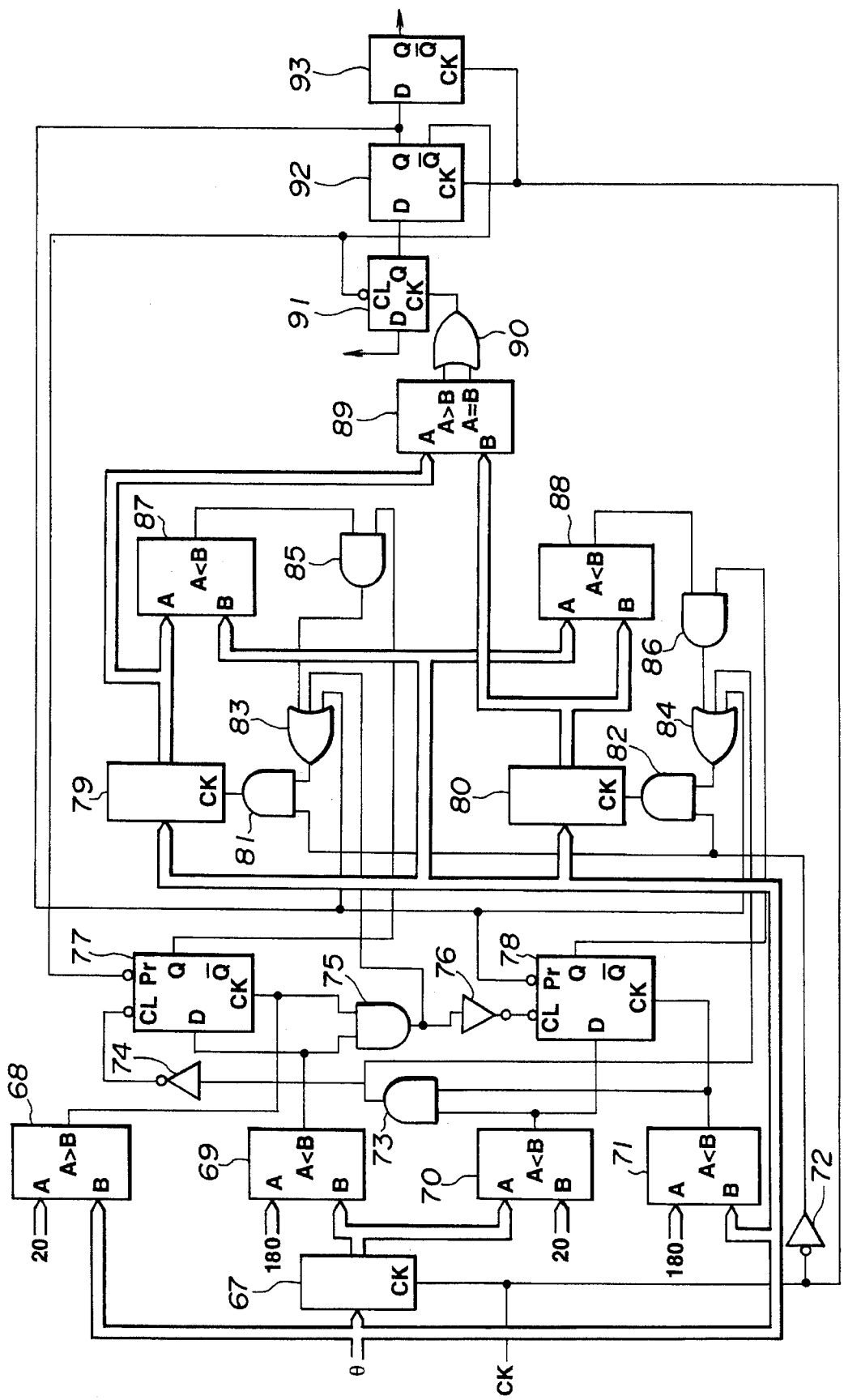
FIG. 2 is a block diagram of a preferred example of a decision circuit applied to the interpolation device of FIG. 1.

The manner of operation of the decision arrangement 15 will be discussed hereinafter in detail with reference to FIG. 2.

Figure 12:
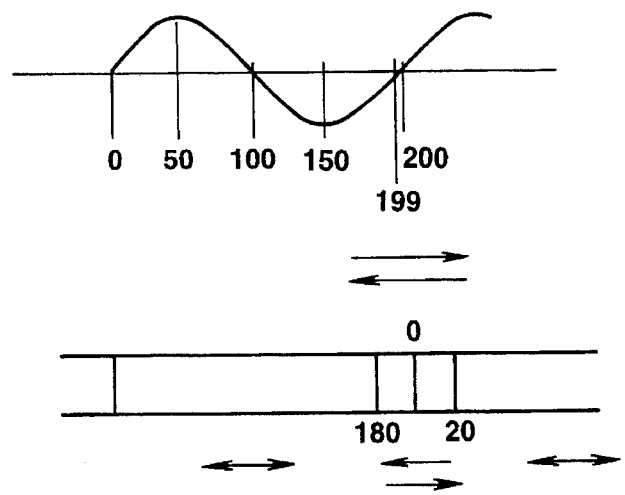
FIG. 12 is a graph which shows a relationship between the detected signal and a digital signal thereof.
Figure 13:
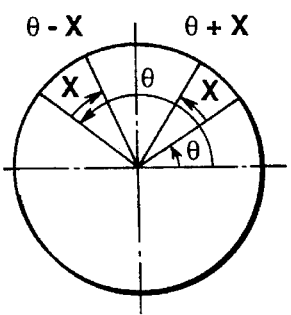
FIG. 13 is a graph which shows a relationship between an amplitude and angle of sine and cosine waves.

Since a scale readout on the scale S is obtained as a periodical function, the explanation of this embodiment is proceeded upon assuming that one period $\lambda$ of the periodical function is 200 ($\lambda = 200$). As shown in FIG. 12, one period of the periodical function is corresponding digital signals 0 to 199. Accordingly, when the sensor is moved in the forward direction (rightward in FIG. 12), the digital signal suddenly decreases from 199 to 0. When the sensor is moved in the backward direction (leftward in FIG. 12), the digital signal suddenly increases from 0 to 199. Accordingly, it is necessary to detect the moving direction of the sensor first. The latch circuit 67 keeps a previously measured signal and outputs it to the comparators 69 and 70. The previously measured signal is compared with predetermined values 20 and 180 in the comparators 69 and 70, respectively. The comparator 69 outputs a logical output 1 (high level) when the previous digital signal is larger than 180. The comparator 68 outputs a logical output 1 (low level) when the present digital signal is smaller than 20. Both outputs supply a logical input 1 to one of two input terminals of an AND circuit 81 through an AND circuit 75 and an OR circuit 83. This input is applied to a clock CK of a latch circuit 79, and the latch circuit 79 latches the digital signal. At this time, a D flip-flop 77 is set according to the output of the comparator 69 such that the data in the forward direction is valid.

Similarly, the comparator 70 outputs an output 1 when the previous digital signal is smaller than 20. When the digital signal is larger than 180, the comparator 71 outputs a logical output 1. Both outputs supply a logical input 1 to one of two input terminals of an AND circuit 82 through an AND circuit 73 and an OR circuit 84. This input is applied to a clock CK of a latch circuit 80 such that the latch circuit 80 latches the digital signal. At this time, a D flip-flop 78 is set according to the output of the comparator 70 such that the data in the backward direction is valid. Since the output of a comparator 89 is 0 in both above-mentioned case, a clock input of a D flip-flop circuit is set at 0 (low level).

For example, when the sensor is moving in the forward direction, an input A of the comparator 89 is increasing and at last a condition A≧B is satisfied. In this situation, the clock input of the D flip-flop circuit 91 becomes 1 (high level), and the D flip-flop circuit 91 is set. Next, a D flip-flop circuit 92 is set, and a D flip-flop circuit 93 is set according to the output of the D flip-flop circuit 92. Accordingly, the D flip-flop circuit 93 outputs a decision output indicative that the sensor has moved one period (has passed a portion between digital signals 199 and 0). When the D flip-flop circuit 92 is turned on, the D flip-flop 77 is turned on. When the D flip-flop 92 is turned off by a next clock input, the D flip-flop 78 is turned on. Accordingly, the data in both directions is treated to be valid, and the operation is repeated to a next period.

With this arrangement of the interpolation device according to the present invention, since errors generated by the mechanical play during the moving operation of the sensor is electrically interpolated, the mechanical structure of the scale arrangement formed is simple.

Figure 3:
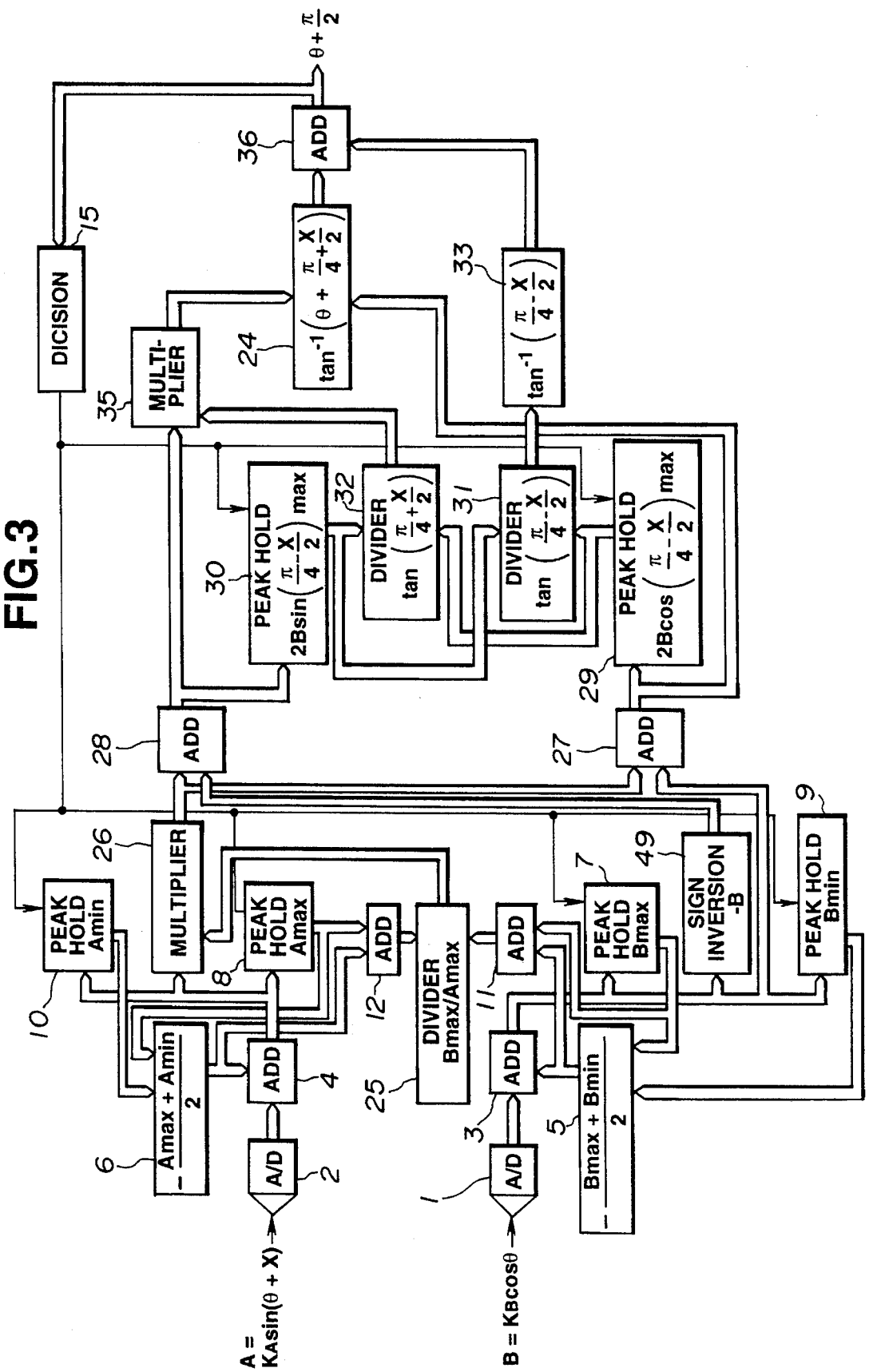
FIG. 3 is a block diagram which shows a second embodiment of the interpolation device for the scale arrangement according to the present invention.

FIG. 3 shows a second embodiment of the interpolation device of the scale arrangement according to the present invention. In the drawing, same numerals designate same parts and elements as that in FIG. 1, and the explanation thereof are facilitated herein.

A divider 25 receives an output $K_B$ of an adder 11 and an output $K_A$ of an adder 12 and outputs an output $K_B/K_A$. A multiplier 26 receives a signal represented by the equation (8) from the adder 4 and a signal $K_B/K_A$ from the divider 25 and outputs an output A2 which is represented by the following equation (12):

$$A2 = \frac{K_B}{K_A} K_A \sin(\theta + X) = K_B \sin(\theta + X) \tag{12}$$

By this calculation, an amplitude of a sine wave signal becomes the same as that of a cosine wave signal. By adding the output of the adder 3 to the output of the multiplier 26 at an adder 28, a signal A3 represented by the following equation (13) is obtained.

$$A3 = K_B\{\sin(\theta+X) - \cos\theta\} \tag{13}$$

The equation (13) is modified as represented by the following equation (14):

$$\begin{aligned} A3 &= -K_B\{\sin(\theta + X) - \cos\theta\} \\ &= -K_B\left\{\sin(\theta + X) + \sin\left(\theta + \frac{\pi}{2}\right)\right\} \\ &= 2K_B\left\{\sin\left(\frac{\pi}{4} - \frac{X}{2}\right)\cos\left(\theta + \frac{X}{2} + \frac{\pi}{4}\right)\right\} \end{aligned} \tag{14}$$

$$K_A' = 2K_B\sin\left(\frac{\pi}{4} - \frac{X}{2}\right) \tag{15}$$

Since $K_A'$ in the equation (15) indicates an amplitude, the peak hold circuit 30 holds the value represented by the equation (15).

Similarly, by adding the output of the adder 3 to the output of the multiplier 26 at an adder 27, a signal A3 represented by the following equation (13) is obtained.

$$B3 = K_B\{\sin(\theta+X)+\cos\theta\} \tag{16}$$

The equation (16) is modified as represented by the following equation (17):

$$\begin{aligned} B3 &= K_B\{\sin(\theta + X) + \cos\theta\} \\ &= K_B\left\{\sin(\theta + X) + \sin\left(\theta + \frac{X}{2}\right)\right\} \\ &= 2K_B\sin\left(\theta + \frac{X}{2} + \frac{\pi}{4}\right)\cos\left(\frac{\pi}{4} - \frac{X}{2}\right) \end{aligned} \tag{17}$$

$$K_B' = 2K_B\cos\left(\frac{\pi}{4} - \frac{X}{2}\right) \tag{18}$$

Since $K_B'$ in the equation (18) indicates an amplitude, the peak hold circuit 29 holds the value represented by the equation (18). By dividing the value held in the peak hold circuit 30 by the value held in the peak hold circuit 29 at the divider 31, a value represented by the following equation (19) is obtained.

$$\frac{K_A'}{K_B'} = \frac{2K_B\sin\left(\frac{\pi}{4} - \frac{X}{2}\right)}{2K_B\cos\left(\frac{\pi}{4} - \frac{X}{2}\right)} = \tan\left(\frac{\pi}{4} - \frac{X}{2}\right) \tag{19}$$

The obtained value outputted from the divider 31 is modified by an inverse function generator 33 as shown by the following equation (20):

$$\tan^{-1}\frac{K_A'}{K_B'} = \frac{\pi}{4} - \frac{X}{2} \tag{20}$$

The equation (15) is modified into the following equation (21):

$$\begin{aligned} K_A' &= 2K_B\sin\left(\frac{\pi}{4} - \frac{X}{2}\right) \\ &= 2K_B\cos\left(\frac{\pi}{2} - \frac{\pi}{4} + \frac{X}{2}\right) \\ &= 2K_B\cos\left(\frac{\pi}{4} + \frac{X}{2}\right) \end{aligned} \tag{21}$$

Similarly, the equation (18) is modified into the following equation (22):

$$K_B' = 2K_B\cos\left(\frac{\pi}{4} - \frac{X}{2}\right) \qquad (22)$$

$$= 2K_B\sin\left(\frac{\pi}{2} - \frac{\pi}{4} + \frac{X}{2}\right)$$

$$= 2K_B\sin\left(\frac{\pi}{4} + \frac{X}{2}\right)$$

Accordingly, by dividing the output of the peak hold circuit 29 by the output of the peak hold circuit 30, a value represented by the following equation (23) is obtained.

$$\frac{K_B'}{K_A'} = \frac{2K_B\sin\left(\frac{\pi}{4} + \frac{X}{2}\right)}{2K_B\cos\left(\frac{\pi}{4} + \frac{X}{2}\right)} = \tan\left(\frac{\pi}{4} + \frac{X}{2}\right) \qquad (23)$$

Since the output of the adder 28 has been applied by the equation (14), the equation (14) is rewritten by using the equation (21) as follows:

$$A3 = 2K_B\cos\left(\frac{\pi}{4} + \frac{X}{2}\right)\cos\left(\theta + \frac{X}{2} + \frac{\pi}{4}\right) \qquad (24)$$

Therefore, by multiplying the output of the adder 28 represented by the equation (24) and the output of the divider 32 represented by the equation (23) at the multiplier 35, a value represented by the following equation (25) is obtained:

$$A4 = \frac{\sin\left(\frac{\pi}{4} + \frac{X}{2}\right)}{\cos\left(\frac{\pi}{4} + \frac{X}{2}\right)} \cdot \qquad (25)$$

$$2K_B\cos\left(\frac{\pi}{4} + \frac{X}{2}\right)\cos\left(\theta + \frac{X}{2} + \frac{\pi}{4}\right)$$

$$= 2K_B\sin\left(\frac{\pi}{4} + \frac{X}{2}\right)\cos\left(\theta + \frac{\pi}{4} + \frac{X}{2}\right)$$

By deforming the equation (17) as implemented in the equation (22), the output of the adder 27 is represented by the following equation (26):

$$B4 = 2K_B\sin\left(\frac{\pi}{4} + \frac{X}{2}\right)\sin\left(\theta + \frac{\pi}{4} + \frac{X}{2}\right) \qquad (26)$$

Since the amplitude of the equation (26) is the same as that of the equation (25), the following equation (27) is obtained by the division of the equation (26) by the equation (25).

$$\frac{B4}{A4} = \tan\left(\theta + \frac{\pi}{4} + \frac{X}{2}\right) \qquad (27)$$

An inverse function generator 24 calculates an inverse function of the equation (27) and outputs a valued represented by the following equation (28):

$$\tan^{-1}\frac{B4}{A4} = \theta + \frac{\pi}{4} + \frac{X}{2} \qquad (28)$$

An inverse function generator 33 calculated an inverse function of the equation (19) and outputs a value represented by the following equation (29):

$$\tan^{-1}\frac{K_A'}{K_B'} = \frac{\pi}{4} - \frac{X}{2} \qquad (29)$$

Accordingly, the adder 36 calculates the sum of the output of the inverse function generator 24 represented by the equation (28) and the output of the inverse function generator 33 represented by the equation (29) and outputs a signal as follows:

$$\left(\theta + \frac{\pi}{4} + \frac{X}{2}\right) + \left(\frac{\pi}{4} - \frac{X}{2}\right) = \theta + \frac{\pi}{2}$$

The signal is correct without phase lag X and used as a measured output. The signal is applied to a decision box 15 as mentioned above and used for generating a synchronizing signal. Accordingly, errors generated by the mechanical lag during the moving operation of the sensor is interpolated electrically, it is possible that the mechanical structure of the scale arrangement formed is simple.

Figure 4:
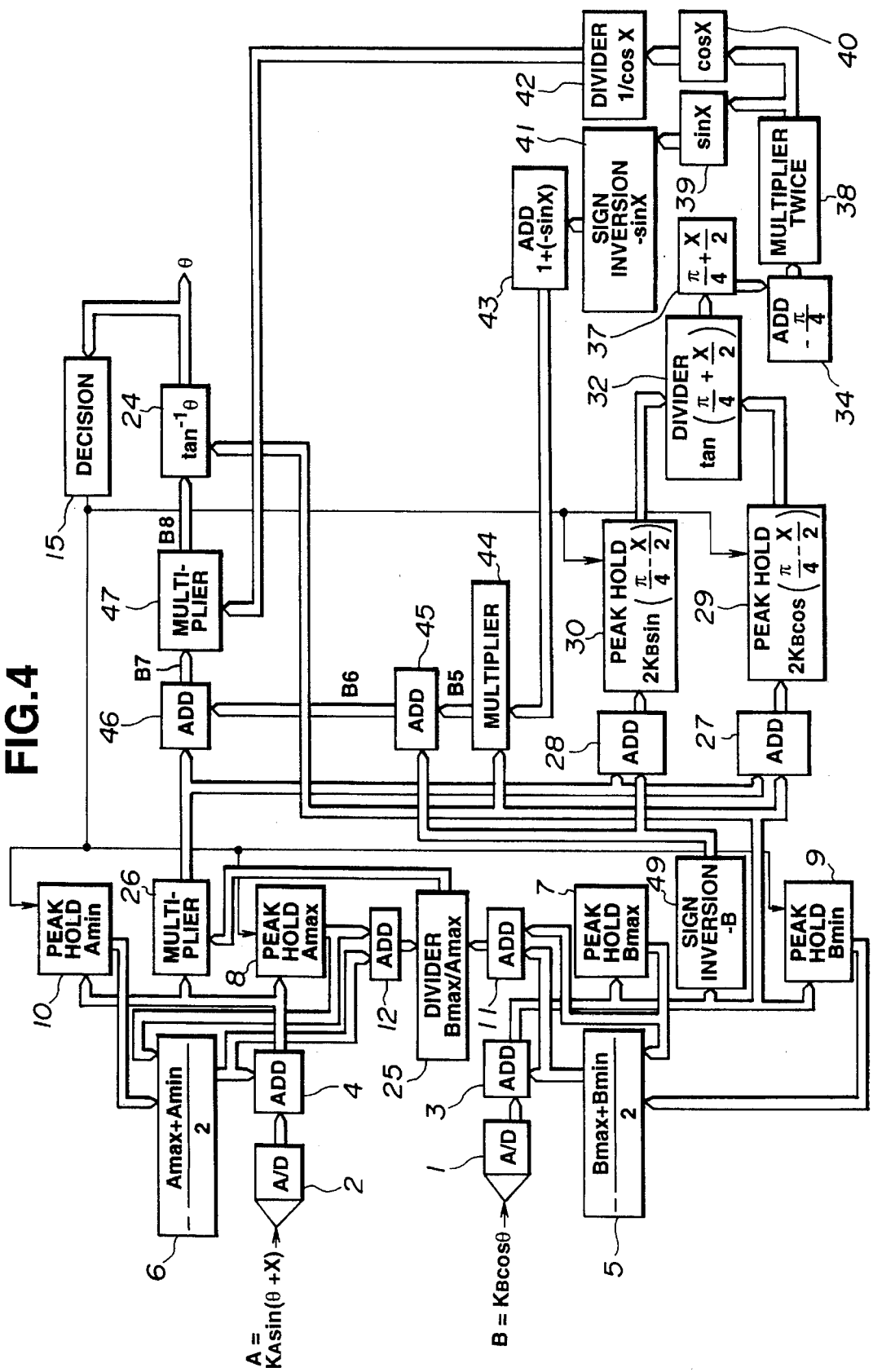
FIG. 4 is a block diagram which shows a third embodiment of the interpolation device for the scale arrangement according to the present invention.
Figure 5:
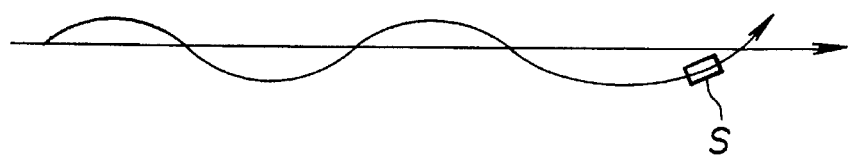
FIG. 5 is a view showing a reading characteristic of the scale arrangement.
Figure 6:
FIG. 6 is a view showing an installing condition of sensors in the scale arrangement.
Figure 7:
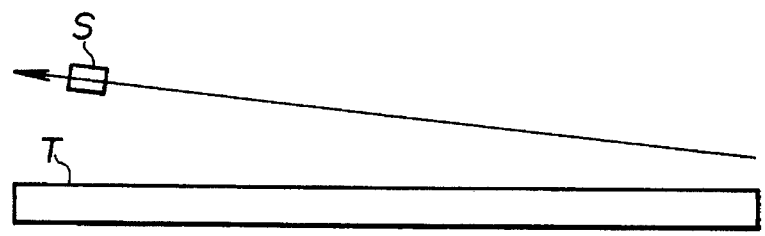
FIG. 7 is a view which shows another reading characteristic of the scale arrangement.

Referring to FIG. 4, there is shown a third embodiment of the interpolation device of the scale arrangement according to the present invention. In the drawing, same numerals designate same parts and elements as that in FIG. 3, and the explanation thereof are facilitated herein.

A divider 32 output a signal represented by the equation (23)

$$\tan\left(\frac{\pi}{4} + \frac{X}{2}\right).$$

An inverse function generator 37 outputs an inverse function of the equation (23) as follows:

$$\tan^{-1}\frac{K_B'}{K_A'} = \frac{\pi}{4} + \frac{X}{2} \qquad (30)$$

In an adder 34, $$-\frac{\pi}{4}$$

is added to the value represented by the equation (30). Then, the multiplier 38 outputs X which is twice the output of the adder 34. Function generators 39 and 40 generate signals sinX and cosX, respectively, by using the output of the multiplier 38. The plus-minus signal inversion of the signal sinX is transformed in the signal inverse circuit 41. Then, the plus-minus signal inverted value is added to 1 in an adder 43, and a signal represented by the following equation (31) is ouputted from the adder 43.

$$C = 1 - \sin X \qquad (31)$$

In a multiplier 44, the output of the adder 3 represented by the equation (4) and the signal represented by the equation (31) are multiplied, and a signal represented by the following equation (32) is outputted:

$$B5 = K_B\cos\theta \cdot (1 - \sin X) \qquad (32)$$

The signal B5 represented by the equation (32) is added to the signal obtained by implementing the signal inversion 49 of the output of the adder 3 in an adder 45, and a signal represented by the following equation (33) is outputted:

$$B6 = K_B\cos\theta \cdot (1 - \sin X) - K_B\cos\theta \quad (33)$$
$$= -K_B\cos\theta\sin X$$

The signal B6 is added to the output of the multiplier 26 represented by the equation (12) in an adder 46, and a signal represented by the following equation (34) is outputted from the adder 46.

$$B7 = K_B\cos\theta\sin X + K_B\sin(\theta + X) \quad (34)$$
$$= K_B\sin\theta\cos X$$

Next, the signal represented by the equation (34) is multiplied with an inverse number of cosX from the divider 42 in a multiplier 47, and a signal represented by the following equation (35) is outputted.

$$B8 = K_B\sin\theta\cos X \cdot \frac{1}{\cos X} = K_B\sin\theta \quad (35)$$

On the basis of the signal represented by the equation (35) and the output of the adder 3, an inverse function generator 24 generates a signal represented by the following equation (36) and then outputs a signal represented by the following equation (37):

$$\frac{B8}{B1} = \frac{K_B\sin\theta}{K_B\cos\theta} = \tan\theta \quad (36)$$

$$\tan^{-1}\frac{B8}{B1} = \theta \quad (37)$$

The obtained signal θ is a correct value without a phase drift and applied as a result of a measured signal. With this arrangement of the interpolation device according to the present invention, since errors generated by the mechanical lag during the moving operation of the sensor is interpolated electrically, it is possible that the mechanical structure of the scale arrangement is simply formed simple.

What is claimed is:

1. A rotational position measuring system having a measuring scale and a sensor for reading the measuring scale, the system comprising:

first input means for inputting an input sine wave signal from said sensor;

second input means for inputting an input cosine wave signal from said sensor;

first output means comprising:
   a first DC offset value calculating circuit for calculating a first DC offset value of the input sine wave signal, and
   a first amplitude coefficient calculating circuit for calculating a first amplitude coefficient of the input sine wave signal, said first output means outputting an interpolated sine wave signal from which the first DC offset value of the input sine wave signal determined by the first DC offset calculating circuit has been removed and which has been normalized according to the first amplitude coefficient determined by the first amplitude coefficient calculating circuit;

second output means comprising:
   a second DC offset value calculating circuit for calculating a second DC offset value of the input cosine wave signal, and
   a second amplitude coefficient calculating circuit for calculating a second amplitude coefficient of the input cosine wave signal, said second output means outputting a corrected cosine wave signal from which the second DC offset value of the input cosine wave determined by the second DC offset calculating circuit has been removed and which has been normalized according to the second amplitude coefficient determined by the second amplitude coefficient calculating circuit;

correcting means for correcting a phase drift between the interpolated sine wave signal output from said first output means and the corrected cosine wave signal output from said second output means, said correcting means outputting a correct measured angle signal based on the interpolated sine wave signal and corrected cosine wave signal; and decision means for determining whether one period of a measuring period has been measured based on the correct measured angle signal of said correcting means and outputting a synchronizing signal to said first output means, said second output means and said correcting means.

2. A system as claimed in claim 1, wherein the first DC offset value calculating circuit comprises a maximum value latch circuit for latching a maximum value of amplitude of the sine wave input signal and a minimum value latch circuit for latching a minimum value of amplitude of the sine wave input signal, the first DC offset value calculating circuit calculating the first DC offset value by averaging the maximum value latched in the maximum value latch circuit and the minimum value latched in the minimum value latch circuit.

3. A system as claimed in claim 1, wherein the first amplitude coefficient calculating circuit comprises a circuit for calculating amplitude of the sine wave input signal as a half of a distance between a maximum value and a minimum value of the amplitude of the sine wave input signal.

4. A system as claimed in claim 1, wherein said correcting means uses one of the input sine wave signal and the input cosine wave signal as a reference value, said correcting means calculating a phase drift between the input sine and cosine wave signals on the basis of the amplitude of the wave signal other than said one of the input sine wave signal and the input cosine wave signal at a time when the reference value takes the maximum value.

5. A system as claimed in claim 1, wherein said correcting means calculates an advanced phase signal and a delayed phase signal each of which has a half of a relative phase drift between the sine and cosine wave signals, said correcting means calculating the correct measured angle signal in a manner to add inverse functions of a advanced phase signal and a delayed phase signal for canceling the phase drift between the sine and cosine wave signals.

6. A system as claimed in claim 1, wherein said correcting means generates a signal indicative of the product of a drift signal indicative of a phase drift condition and an angular signal indicative of a measuring angle signal on the basis of the interpolated sine wave signal and the corrected cosine wave signal, said correcting means calculating the drift signal indicative of the phase drift condition independently and obtaining the correct measured angle signal by dividing the product signal by the independently obtained drift signal.

7. A system as claimed in claim 1, wherein the second DC offset value calculating circuit comprises a maximum value latch circuit for latching a maximum value of amplitude of the cosine wave input signal and a minimum value latch circuit for latching a minimum value of amplitude of the cosine wave input signal, the second DC offset value calculating circuit calculating the second DC offset value by averaging the maximum value latched in the maximum value latch circuit and the minimum value latched in the minimum value latch circuit.

8. A system as claimed in claim 1, wherein the second amplitude coefficient calculating circuit comprises a circuit for calculating amplitude of the cosine wave input signal as a half of a distance between a maximum value and a minimum value of the amplitude of the cosine wave input signal.

* * * * *